April 22, 1924.                                              1,491,112
                        E. W. SPINK
           COMPOSITE BOARD AND PROCESS FOR MAKING THE SAME
                      Filed Nov. 13, 1920
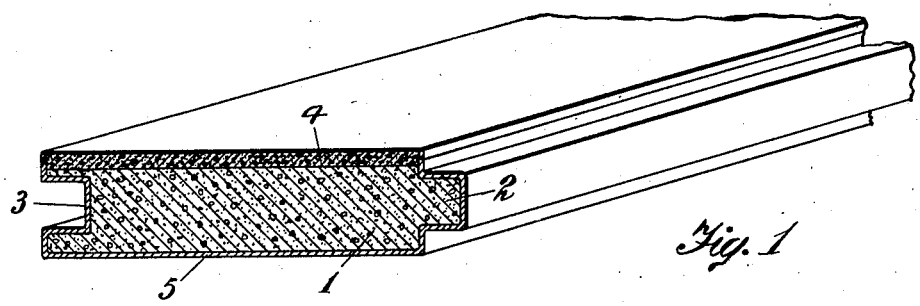
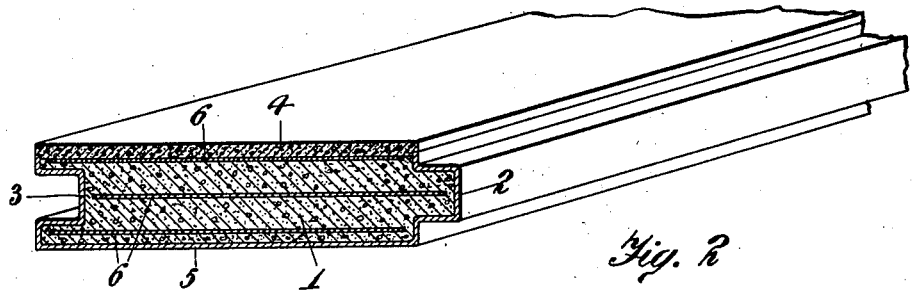
Inventor
Ernest W. Spink
By his Attorney
N.A. de Romeville Patented Apr. 22, 1924.

1,491,112

UNITED STATES PATENT OFFICE.

ERNEST W. SPINK, OF BUFFALO, NEW YORK.

COMPOSITE BOARD AND PROCESS FOR MAKING THE SAME.

Application filed November 13, 1920. Serial No. 423,796.

*To all whom it may concern:*

Be it known that I, ERNEST W. SPINK, a citizen of the United States, and resident of Buffalo, in the county of Erie and State of New York, have invented certain new and useful Improvements in Composite Boards and Processes for Making the Same, of which the following is a specification.

This invention relates to composite board and the process for making the same. The object of the invention is the production of composite board that may be used for flooring, ceiling, siding, mouldings and for other purposes. The invention contemplates the production of composite board, the essential ingredients of which comprise a mixture of cementitious and vegetal substances and a mixture of cementitious mineral and vegetal substances. In the method of the manufacture of the board it is contemplated to mould the mixture to give it its requisite shape and size while flowing in a continuous stream, which latter is subsequently cut into proper lengths.

The composite board is fire and water proof and sufficiently hard to produce a wearing surface superior to the ordinary wood flooring. The board is preferably made of a form and size, with square joints, tongue and groove and various other joints, which will permit of its being used in the manner of ordinary wooden flooring, ceiling, siding and the like.

The invention contemplates the production of various grades and qualities of the composite board and the exemplification of the board described in this specification is indicative and not limitative of the invention. The board may be provided with a support or casing of paper, cloth, burlap, wood or of various fibrous materials, which partly enclose it. This paper, cloth, burlap and the like may also be used to reinforce the board by being used as plies in the substance thereof.

In the accompanying drawings Fig. 1 represents a perspective view of an exemplification of the composite board and Fig. 2 is a view similar to Fig. 1 with a modification.

Referring to Fig. 1 the body portion or lower layer 1 of the composite board is shown in this instance with the tongue 2 and groove 3. The mixture of the body portion 1 comprises the following ingredients in proportions by weight about as follows: plaster of Paris 1, cement 1, sawdust $\frac{1}{2}$, excelsior $\frac{1}{4}$, moss $\frac{1}{4}$ and hair $\frac{1}{8}$. The plaster of Paris and cement are ground and mixed with the other ingredients. A sufficient quantity of water is added to form a plastic mass that will flow.

The numeral 4 indicates the outer portion, upper layer or coating of the composite board, which consists of a mixture of cementitious mineral and vegetal substances, and consisits in this exemplification, of the following ingredients in proportions by weight about as follows: calcined magnesite or magnesium carbonate 1, magnesium chloride $\frac{1}{2}$, and sawdust or cork dust $\frac{1}{4}$ forming a plastic mass. This mixture of coating when dried forms a harder and tougher substance than the body portion 1. The coating 4 which adheres to the body portion 1, when both have been dried, produces a strong and tough wearing surface for the board which can easily be polished.

The casing or support 5 in this instance may be made of a mixture of paper, cloth, burlap, wood and the like in about equal proportions by weight or it may consist of either one of these ingredients or a mixture of any two or more of them. The said casing facilitates the manufacture of the board and also constitutes a protector from injury when the board is handled. Wood pulp, straw, hay, cocoanut fiber, paper and torn rags may be substituted for the vegetal ingredients above mentioned for the body portion 1, coating 4 and the casing 5.

In Fig. 2 there is shown a board with the body portion 1, having the tongue 2, groove 3, coating 4 and casing 5 similar to those described for Fig. 1, but which has imbedded in its body portion 1 reinforcing strips 6, which may be made of paper, cloth, burlap, wood and the like in about equal proportions by weight, or it may be made of either one of these ingredients or a mixture of any two or more of them.

The ingredients of the strips 6 are commingled with a requisite quantity of water to form a plastic mass, which is molded into proper shape, dried and cut into proper lengths.

An exemplification of the steps to produce the composite board may be as follows:

To produce the casing 5, the plastic mass comprising its ingredients or paper or any material that is used is shaped in suitable molds or dies or between suitable rollers.

Then to make the board shown in Fig. 1, the casing is forced through a die of a form similar to the casing, to maintain the casing in its normal shape. The casing then passes through an elongated mold to maintain its contour in proper shape. While the casing is passing through the latter mold the body portion 1 is uniformly deposited into it to a predetermined depth, and upon further travel of the casing with the body portion, the coating 4 is uniformly deposited upon the body portion 1 to a predetermined thickness.

The board is then cut into lengths and dried, the portions of the board forming a solid mass.

To produce the board shown in Fig. 2 steps similar to these described for the board in Fig. 1 are used and the reinforcing strips 6 are automatically inserted into the body portion 1 at proper intervals to obtain a sufficient quantity of the mixture between them. When the board is dried the coating 4 is converted into a tougher and stronger substance than the other portion of the board.

It is to be understood that various modifications may be made in the ingredients, their proportions and the steps to produce the board without departing from the spirit of the invention.

Having described my invention what I desire to secure by Letters Patent and claim is:—

1. In a composite board the combination of a body portion of cementitious and vegetal substances and a coating firmly secured thereto comprising a mixture of cementitious mineral substances, and sawdust.

2. In a composite board the combination of a mixture of cementitious and vegetal substance forming the body portion thereof, reinforcing strips of a mixture of vegetal ingredients imbedded in said body portion, a coating of a mixture of cementitious mineral and vegetal substances for the body portion and connected thereto and harder than the body portion when the board has dried and a vegetal casing for said body portion and connected thereto.

3. In a composite board the combination of a mixture of plaster of Paris, cement, sawdust, excelsior, moss and hair for the body portion thereof and a mixture of calcined magnesite, magnesium chloride, sawdust and cork dust for a coating of said body portion.

4. The method of making a composite board consisting in forming a casing of a vegetal substance, forming a mixture of cementitious and vegetal ingredients into a plastic mass, introducing said mass into the casing to constitute the body portion of the composite board, adding a coating of a plastic mixture of cementitious mineral and vegetal ingredients to a surface of the body portion and drying the board, said coating when dry forming an outer surface for the board stronger and tougher than its body portion.

5. The method of making a composite board consisting in forming a casing of a vegetal substance, forming a mixture of cementitious and vegetal ingredients into a plastic mass, introducing said mass into the casing to constitute the body portion of the composite board, introducing reinforcing strips into said body portion and adding a coating of plastic mixture of cementitious mineral and vegetal ingredients to a surface of the body portion.

Signed at the borough of Manhattan, city of New York, in the county of New York and State of New York, this 29th day of October A. D. 1920.

ERNEST W. SPINK.